United States Patent
Scheidling et al.

(10) Patent No.: US 6,189,408 B1
(45) Date of Patent: Feb. 20, 2001

(54) CONDUIT SUPPORTED SWIVEL TUBE

(75) Inventors: Matthias Scheidling, Freiberg; Arndt Bürger, Einbeck, both of (DE); Grant Webb, Howell, MI (US)

(73) Assignee: Teleflex Incorporated, Plymouth Meeting, PA (US)

( * ) Notice: Under 35 U.S.C. 154(b), the term of this patent shall be extended for 0 days.

(21) Appl. No.: 09/366,228

(22) Filed: Aug. 3, 1999

(51) Int. Cl.[7] .................................................. F16C 1/10
(52) U.S. Cl. ............................................................ 74/502.4
(58) Field of Search ................................. 74/500.5, 502, 74/502.4, 502.5, 502.6, 503

(56) References Cited

U.S. PATENT DOCUMENTS

| 2,550,670 | | 5/1951 | Brickman . | |
|---|---|---|---|---|
| 3,411,373 | * | 11/1968 | Zieber et al. | 74/502.5 |
| 3,429,197 | | 2/1969 | Loewenstern | 74/502 |
| 3,528,313 | | 9/1970 | Berno . | |
| 3,678,964 | | 7/1972 | Andrews | 138/103 |
| 4,038,881 | | 8/1977 | Conrad | 74/501.5 R |
| 4,088,156 | * | 5/1978 | Kubo et al. | 74/502.4 |
| 4,238,974 | * | 12/1980 | Fawcett | 74/502.5 |
| 4,300,408 | * | 11/1981 | Yoshifuji | 74/502.5 |
| 4,321,840 | | 3/1982 | Kalamon | 74/501.5 R |
| 4,333,361 | | 6/1982 | Spease | 74/501 |
| 4,406,177 | * | 9/1983 | Bennett et al. | 74/500.5 |
| 4,572,696 | | 2/1986 | Morikawa | 403/265 |
| 4,649,010 | * | 3/1987 | Bennett et al. | 74/502.5 |
| 4,773,279 | * | 9/1988 | Spease et al. | 74/502.4 |
| 5,161,428 | * | 11/1992 | Petruccello | 74/502.4 |
| 5,245,887 | * | 9/1993 | Tanaka et al. | 74/502.5 |
| 5,315,892 | * | 5/1994 | Gabas et al. | 74/502.5 |
| 5,337,621 | * | 8/1994 | Spease | 74/502.6 |
| 5,383,377 | * | 1/1995 | Boike | 74/502.4 |
| 5,448,926 | * | 9/1995 | Reasoner | 74/500.5 |
| 5,531,134 | * | 7/1996 | Petruccello | 74/502.4 |
| 5,579,663 | * | 12/1996 | Likich et al. | 74/502.4 |
| 5,582,074 | * | 12/1996 | Kelley et al. | 74/502.4 |
| 5,699,697 | * | 12/1997 | Petruccello et al. | 74/502.6 |
| 5,722,301 | * | 3/1998 | Schaaphok | 74/502.4 |
| 5,862,580 | * | 1/1999 | Petruccello et al. | 29/434 |
| 5,862,710 | * | 1/1999 | Koenig | 74/502.4 |
| 5,862,711 | * | 1/1999 | Oda | 74/502.4 |
| 5,884,531 | * | 3/1999 | Koenig | 74/502.4 |
| 5,911,790 | * | 6/1999 | Bates et al. | 74/502.4 |
| 6,105,458 | * | 8/2000 | Casas Gomila et al. | 74/502.4 |

FOREIGN PATENT DOCUMENTS

| 1103087 | * | 3/1961 | (DE) | 74/502.4 |
|---|---|---|---|---|
| 2644532 | * | 9/1990 | (FR) | 74/502.6 |
| 1458523 | * | 12/1976 | (GB) | 74/502.4 |
| 2040383 | * | 8/1980 | (GB) | 74/502.4 |
| 362067 | * | 12/1938 | (IT) | 74/502.4 |
| 61-166221 | * | 10/1986 | (JP) | 74/502.6 |

* cited by examiner

Primary Examiner—David A. Bucci
Assistant Examiner—Chong H. Kim
(74) Attorney, Agent, or Firm—Howard & Howard

(57) ABSTRACT

The assembly is characterized by simultaneously molding the support fitting (18) and the swivel tube (20) of an organic polymeric material to be bonded to the conduit which extends between the support fitting (18) and the swivel tube (20) to allow the swivel tube (20) to oscillate.

19 Claims, 2 Drawing Sheets

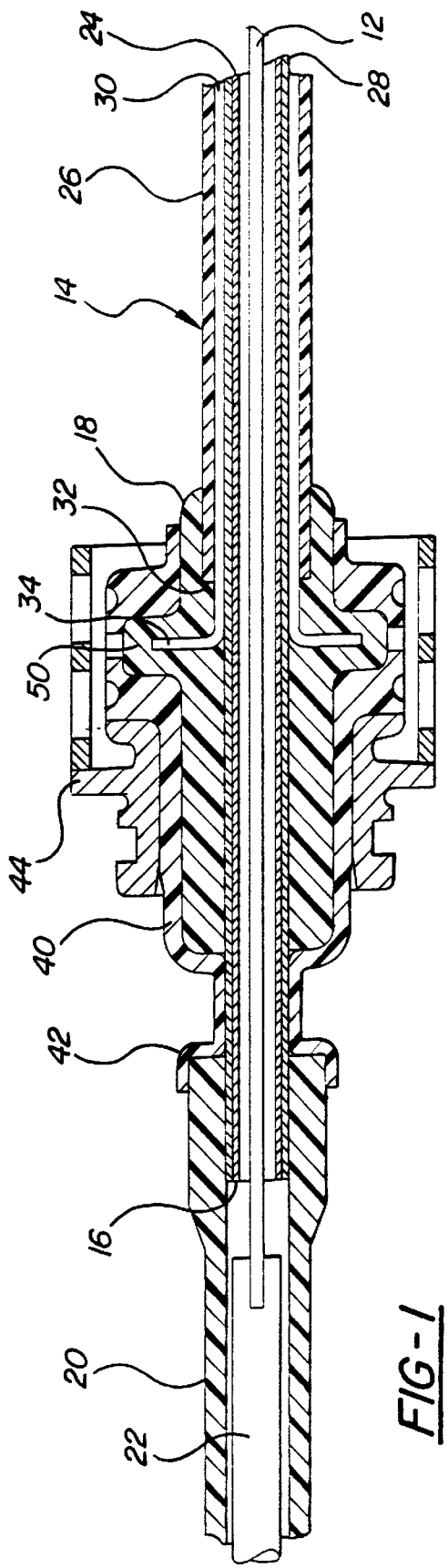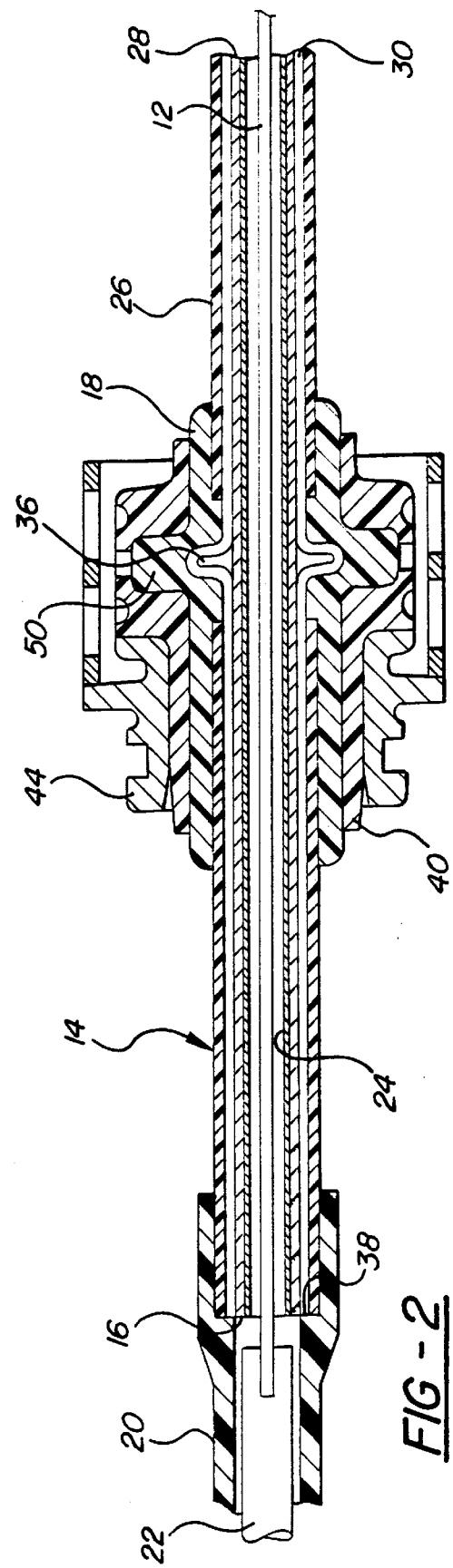

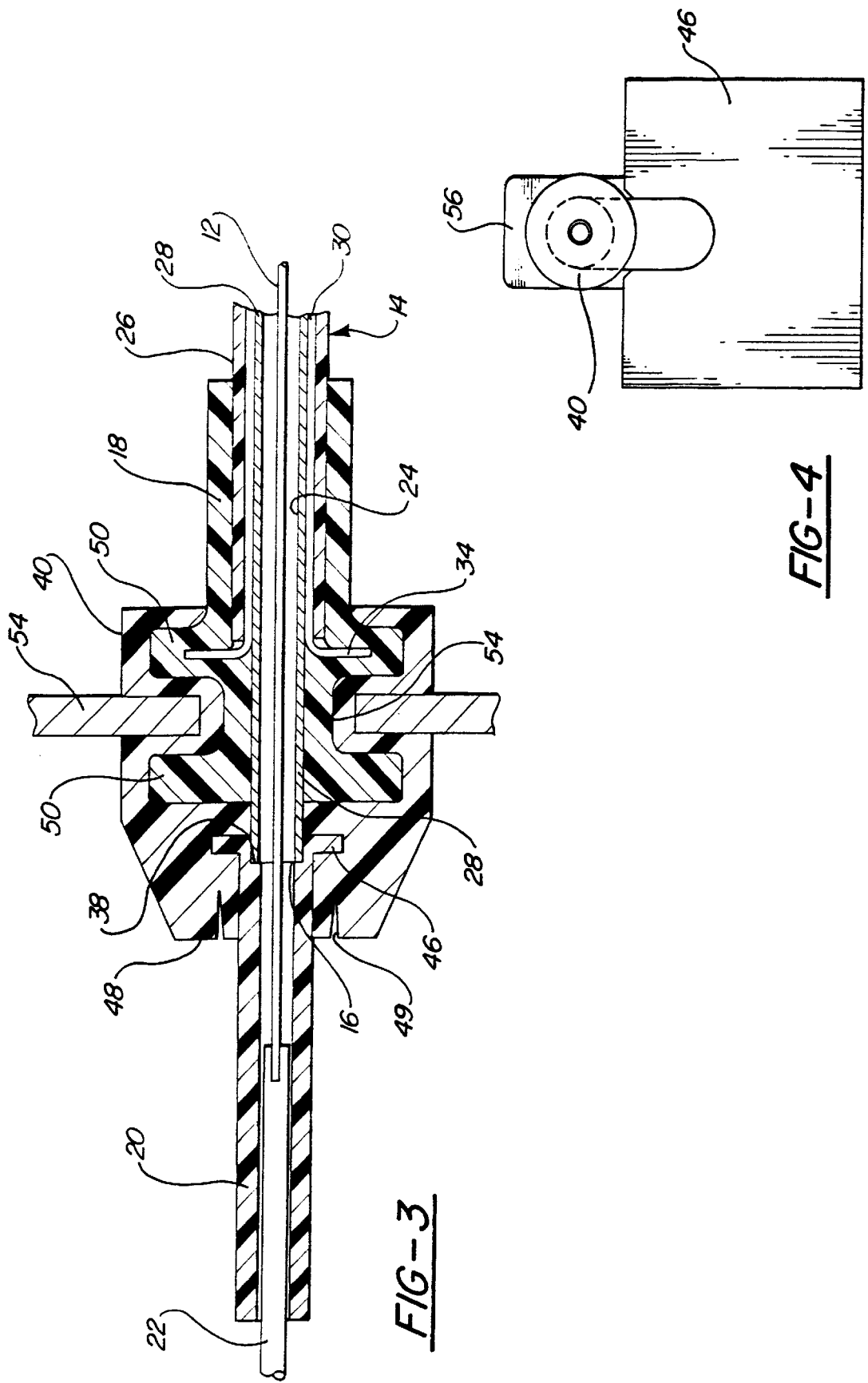

CONDUIT SUPPORTED SWIVEL TUBE

BACKGROUND OF THE INVENTION

1. Field of the Invention

The subject invention relates to a motion transmitting remote control assembly of the type for transmitting motion in a curved path by a flexible motion transmitting core element movably supported in a conduit and, more specifically, to such an assembly including a swivel tube attached to the end of the conduit for slidably supporting a rod attached to the end of the core element.

2. Description of the Prior Art

Such assemblies are well known in the prior art and many have been developed by the assignee of the subject invention as exemplified by U.S. Pat. No. 3,429,197 to Loewenstem. However, such assemblies are fabricated by separate steps for the support fitting, which supports the conduit on a structure. Alternatively, the swivel tube is supported in a female socket in the support fitting, a relatively complex fabrication process, as illustrated in U.S. Pat. No. 4,333,361 to Spease.

SUMMARY OF THE INVENTION AND ADVANTAGES

A method of fabricating a motion transmitting remote control assembly comprising a conduit movably supporting a core element and having first and second ends with a support fitting spaced from the first end of the conduit for supporting the conduit on a support structure, a swivel tube attached to the first end of the conduit in spaced relationship to the support fitting and a rod attached to the core element and movably supported in the swivel tube. The method is characterized by simultaneously molding the support fitting and the swivel tube of an organic polymeric material in bonded relationship to the conduit.

In the resulting assembly, the support fitting and the swivel tube consist of an organic polymeric material bonded to the conduit. This new assembly eliminates the complex process of assembling a swivel tube in a socket in the support fitting and utilizes the conduit as the swivel joint.

DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary cross sectional view of a first embodiment;

FIG. 2 is a fragmentary cross sectional view of a second embodiment;

FIG. 3 is a fragmentary cross sectional view of a third embodiment; and

FIG. 4 is a view showing the installation of the third embodiment.

DETAILED DESCRIPTION OF THE PREFERRED EMBODIMENT

Referring to the Figures, wherein like numerals indicate like or corresponding parts throughout the several views, a motion transmitting remote control assembly constructed in accordance with the subject invention is shown in each of FIGS. 1 and 2.

Each embodiment includes a flexible motion transmitting core element 12 for transmitting motion in a curved path. The core element 12 is usually made of a wire or filaments forming a cable.

A conduit, generally indicated at 14, movably supports the core element 12 and has first and second ends, i.e., to the left and to the right, the first or left end being indicated at 16. A support fitting 18 is spaced from the first end of the conduit 14 for supporting the conduit 14 on a support structure, not shown, but comprises a bracket, bulkhead, or the like, as is well known in the art.

A swivel tube is attached to the first end 16 of the conduit 14 in spaced relationship to the support fitting 18. A metal rod 22 is attached to the core element 12 by swaging, or the like, and is movably supported by the swivel tube 20.

The method of fabrication of the assembly is characterized by simultaneously molding the support fitting 18 and the swivel tube 20 of an organic polymeric material, i.e., plastic, in bonded relationship to the conduit 14 whereby the assembly is characterized by the support fitting 18 and the swivel tube 20 consisting of an organic polymeric material bonded to said conduit 14. Preferably, the support fitting 18 and the swivel tube 20 are molded of the identical organic polymeric material which is bonded to the conduit 14.

As is typical in such assemblies, the conduit 14 includes an inner tubular liner 24 consisting of an extruded organic polymeric material. A sheath surrounds the inner tubular liner 24 and a casing 26 surrounds the sheath. Both of the inner tubular liner 24 and the casing 26 also consist of an organic polymeric material. More specifically, the sheath includes a flatwrap 28 wound helically on a short lead about the inner tubular liner 24 and a plurality of long lay filaments 30 disposed helically on a long lead about the flatwrap 28. In some instances, the sheath may include only one or the other of the flatwrap 28 and long lay filaments 30. The flatwrap 28 is disposed radially between the inner tubular liner 24 and plurality of long lay filaments 30.

The plurality of long lay filaments 30 are bent to extend radially into the support fitting 18. In other words, the method of fabrication includes the step of deforming the sheath radially into the support fitting 18. In the embodiment of FIG. 1, the casing 26 terminates at an end 32 in the support fitting 18 and the long lay filaments 30 are flared 34 into and terminate in the support fitting 18 resulting in the underlying flatwrap 28 extending into the swivel tube 20. Therefore, the swivel tube 20 is indirect contact with the flatwrap 28 of the sheath. In the second embodiment of FIG. 2, the long lay filaments 30 extend radially through an undulation 36 to extend radially into the support fitting 18 and extend therefrom to the first end 16 of the conduit 14. The swivel tube 20 includes a radial shoulder 38 in abutting relationship with the first end 16 of the conduit 14 and the long lay filaments 30 terminate in abutting relationship with the shoulder 38 of the swivel tube 20. The casing 26 in FIG. 2 presents an annular void and the undulation 36 extends radially through the void whereby the casing 26 extends from the void and into the swivel tube 20 to also terminate in abutting relationship with the shoulder 38 of the swivel tube 20. Accordingly, the fabrication process includes the step of stripping the casing 26 to provide a void therein and molding the support fitting 18 in direct contact with the sheath in the void for anchoring thereto. In any case, the support fitting 18 is in direct contact with the sheath for anchoring thereto, i.e., the support fitting 18 is bonded to the sheath during the molding and curing thereof. The swivel tube 20 is also molded in direct contact with the sheath.

The assembly also includes a vibration dampening material 40 surrounding the support fitting 18. In the case of FIG.

1, the vibration dampening material 40 extends about and along the flatwrap 28 between the support fitting 18 and the swivel tube 20 to the swivel tube 20 and surrounding a portion 42 the end of the swivel tube 20. The fabrication includes the step of disposing by molding the vibration dampening material 40 around the support fitting 18 and, in the case of FIG. 1, about the conduit 14 to the swivel tube 20 to surround a portion 42 of the swivel tube 20.

An attachment element 44 surrounds the vibration dampening material 40 for attaching the assembly to a support structure such as a bracket, bulkhead, or the like.

The embodiment of FIG. 3 includes the same elements as the previous embodiments including a vibration dampening material 40 surrounding the support fitting 18 and extending about the conduit 14 to the swivel tube 20 and surrounding a portion of the swivel tube 20. The swivel tube 20 includes an annular flange 46 embedded in the vibration dampening material 40. The vibration dampening material 40 presents an end face 48 extending radially from the swivel tube 20 and the end face 48 has reliefs or cuts 49 extending thereinto for allowing swiveling movement of the swivel tube 20, i.e., so that the vibration dampening material 40 does not unduly restrict swiveling movement of the swivel tube 20.

In all embodiments, the fitting 18 includes at least one radial flange 50 and the long lay filaments 30 extend radially into the radial flange 50 of the support fitting 18; however, in the embodiment of FIG. 3, the fitting 18 includes two radial flanges 50 spaced axially to define an annular groove 52 therebetween and the vibration dampening material 40 extends into the groove 52. An attachment element 54 is disposed in the groove 52 and is gripped by the vibration dampening material 40 to be retained between the radial flanges 50. As shown in FIG. 4, the assembly may be shipped with a shipping clip 56 disposed in the space in the vibration dampening material 40 into which the attachment element 54 is disposed and during installation it is forced out of that space in the vibration dampening material 40 as it is replaced by the attachment element 54.

In accordance with well known molding techniques, the conduit may be placed in a mold having two adjacent cavities, one for the support fitting 18 and one for the swivel tube 20, to thereby simultaneously mold the support fitting 18 and the swivel tube 20 about the conduit.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly comprising;
    a flexible motion transmitting core element (12) for transmitting motion in a curved path,
    a conduit (14) movably supporting said core element (12) and having a first and second ends,
    a support fitting (18) spaced from said first end (16) of said conduit (14) for supporting said conduit (14) on a support structure,
    a swivel tube (20) attached to said first end (16) of said conduit (14) in spaced relationship to said support fitting (18), and
    a rod (22) attached to said core element (12) and movably supported by said swivel tube (20),
    said support fitting (18) and said swivel tube (20) consisting of an organic polymeric material bonded to said conduit (14),
    said conduit (14) including an inner tubular liner (24), a sheath surrounding said inner tubular liner (24) and a casing (26) surrounding said sheath, said inner tubular liner (24) and said casing (26) consisting of an organic polymeric material said support fitting (18) being in direct contact with said sheath for anchoring thereto and
    said swivel tube (20) being in direct contact with said sheath.

2. An assembly as set forth in claim 1 wherein said support fitting (18) and said swivel tube (20) consist of the identical organic polymeric material bonded to said conduit (14).

3. A motion transmitting remote control assembly comprising;
    a flexible motion transmitting core element (12) for transmitting motion in a curved path,
    a conduit (14) movably supporting said core element (12) and having first and second ends,
    a support fitting (18) spaced from said first end (16) of said conduit (14) for supporting said conduit (14) on a support structure,
    a swivel tube (20) attached to said first end (16) of said conduit (14) in spaced relationship to said supporting fitting (18), and
    a rod (22) attached to said core element (12) and movably supported by said swivel tube (20),
    said support fitting (18) and said swivel tube (20) consisting of an organic polymeric material bonded to said conduit (14),
    said conduit (14) including an inner tubular liner (24), a sheath surrounding said inner tubular liner (24) and a casing (26) surrounding said sheath, said inner tubular liner (24) and said casing (26) consisting of an organic polymeric material said support fitting (18) being in direct contact with said sheath for anchoring thereto and
    said swivel tube (20) being in direct contact with said sheath wherein said sheath includes a plurality of long lay filaments (30) disposed helically on a long lead and bent to extend radially into said support fitting (18).

4. An assembly as set forth in claim 3 wherein said sheath includes a flatwrap (28) wound helically on a short lead radially between said inner tubular liner (24) and said long lay filaments (30).

5. An assembly as set forth in claim 4 wherein said casing (26) terminates in said support fitting (18) and said long lay filaments (30) are flared (34) into and terminate in said support fitting (18), and said flatwrap (28) extends into said swivel tube (20).

6. An assembly as set forth in claim 5 including a vibration dampening material (40) surrounding said support fitting (18) and extending about said flatwrap (28) to said swivel tube (20) and surrounding a portion of said swivel tube (20).

7. An assembly as set forth in claim 6 including an attachment element (44) surrounding said vibration dampening material (40).

8. An assembly as set forth in claim 3 wherein said swivel tube (20) includes a radial shoulder (38) in abutting relationship with said first end (16) of said conduit (14), said long lay filaments (30) extend radially through an undulation (36) to extend radially into said support fitting (18) and extend therefrom to said first end (16) of said conduit (14) to terminate in abutting relationship with said shoulder (38) of said swivel tube (20).

9. An assembly as set forth in claim 8 wherein said casing (26) presents an annular void and said undulation (36) extends radially through said void, and said casing (26) extends from said void and into said swivel tube (20) to terminate in abutting relationship with said shoulder (38) of said swivel tube (20).

10. An assembly as set forth in claim 9 including a vibration dampening material (40) surrounding said support fitting (18).

11. An assembly as set forth in claim 10 including an attachment element (44,54) surrounding said vibration dampening material (40).

12. An assembly as set forth in claim 11 wherein said sheath includes a flatwrap (28) wound helically on a short lead radially between said inner tubular liner (24) and said long lay filaments (30).

13. An assembly as set forth in claim 3 including a vibration dampening material (40) surrounding said support fitting (18) and extending about said conduit (14) to said swivel tube (20) and surrounding a portion of said swivel tube (20).

14. An assembly as set forth in claim 13 wherein said swivel tube (20) includes an annular flange (46) embedded in said vibration dampening material (40).

15. An assembly as set forth in claim 14 wherein said vibration dampening material (40) presents an end face (48) extending radially from said swivel tube (20).

16. An assembly as set forth in claim 15 wherein said end face (48) has reliefs (49) extending thereinto for allowing swiveling movement of said swivel tube (20).

17. An assembly as set forth in claim 13 wherein said fitting (18) includes at least one radial flange (50) and said long lay filaments (30) extend radially into said radial flange (50) of said support fitting (18).

18. An assembly as set forth in claim (16) wherein said fitting (18) includes two radial flanges (50) spaced axially to define an annular groove (52) therebetween, said vibration dampening material (40) extending into said groove (52).

19. An assembly as set forth in claim 18 including an attachment element (54) disposed in said groove (52) and gripped by said vibration dampening material (40) to be retained between said radial flanges (50).

* * * * *